Dec. 17, 1929.     E. H. SANDERS     1,739,915
ADVERTISING DEVICE
Filed Jan. 10, 1928
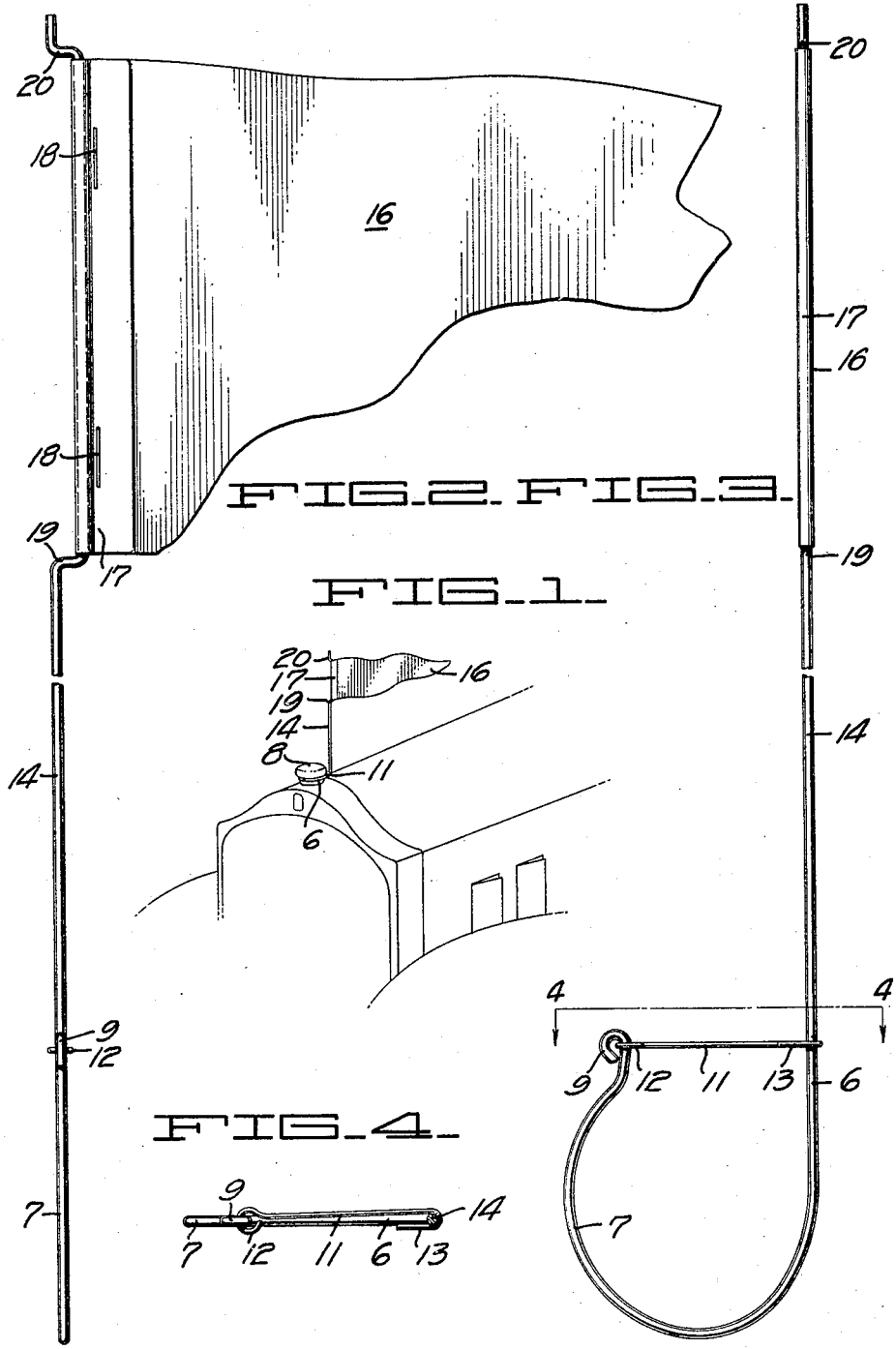

Patented Dec. 17, 1929

1,739,915

UNITED STATES PATENT OFFICE

EDWARD H. SANDERS, OF SAN FRANCISCO, CALIFORNIA, ASSIGNOR TO SHELL COMPANY OF CALIFORNIA, OF SAN FRANCISCO, CALIFORNIA, A CORPORATION OF CALIFORNIA

ADVERTISING DEVICE

Application filed January 10, 1928. Serial No. 245,663.

My invention relates to a device primarily adapted to be secured to vehicles in a conspicuous location thereon to bear advertising matter in a manner to attract attention.

The custom has grown up among automobile owners to display advertising seals and stickers on their vehicles. These make very effective displays, from the standpoint of the advertiser, but tend to detract from the appearance of the vehicle when used in large numbers and promiscuously. Further, the usual type of advertising sticker is placed on the vehicle windshield and when a number of them are so positioned, they tend materially to restrict the driver's vision. This has led in some localities to the prohibtion of stickers on vehicle windshields. Also, the adhesive substances for applying the stickers render them difficult to remove.

It is therefore an object of my invention to provide an advertising device primarily for attachment to automobiles which attracts attention and is easily installed and removed.

A further object of my invention is to provide an advertising device which can be installed in a prominent location on the automobile without interfering with the driver's vision.

An additional object of my invention is to provide an advertising device which will move when the vehicle is in motion as a further means of attracting attention to the adverstising matter.

My invention possesses other advantageous features, some of which with the foregoing will be set forth at length in the following description where I shall outline in full that form of the advertising device of my invention which I have selected for illustration in the drawings accompanying and forming part of the present specification. In said drawings I have shown one form of advertising device embodying my invention, but it is to be understood that I do not limit myself to such form since the invention, as set forth in the claims, may be embodied in a plurality of forms.

In the drawings:

Fig. 1 shows in perspective the fore portion of an automobile with the device of my invention attached thereto.

Fig. 2 is a side elevation of my device as adapted to be attached to other portions of an automobile than that shown in Fig. 1.

Fig. 3 is a front elevation of the device of my invention illustrated in Fig. 2.

Fig. 4 is a cross sectional view, the plane of section being taken on the line 4—4 of Fig. 3.

In its preferred form, the advertising device of my invention includes a clip for attachment to the radiator spout of an automobile and having an extension on which an advertising banner is mounted.

Usually I form a clip 6 of a length of wire having considerable inherent springiness and which is permanently deformed at one end to provide a partial loop 7 for encompassing the radiator spout 8 of an automobile. The terminus of the wire is sharply bent into an eyelet 9 spaced sufficiently far from the opposite side of the loop to permit the wire to be tightly clipped about the radiator spout.

To enhance the grip of the clip on the spout and to prevent accidental disengagement therefrom, a closure preferably extends from the eyelet to the main portion of the wire. A link 11 suitably formed of a length of wire of relatively small diameter is itself at one end provided with an eyelet 12 engaging the eyelet 9 for free movement and at the other end is bent back upon itself to provide a hook 13 to engage the wire 6. The inherent springiness of the loop 7 maintains the hook over the wire 6 but permits disengagement of the hook upon proper manipulation of the link 11.

Inasmuch as it is desired to display the advertising matter in a conspicuous location, I preferably form an extension 14 from the clip 6 and usually the wire 6 is simply extended vertically from one leg of the loop. Ordinarily the sloop is clipped in a horizontal position on the radiator spout and I therefore bend the extension 14 at right angles to the associated loop leg as shown in Fig. 1.

The advertising matter preferably is imprinted on a banner 16 suitably mounted on the extension 14. This can conveniently be accomplished by providing a hem 17 held in place by the fasteners 18 or by other suitable means. In order that the banner can be maintained in its relative position on the extension 14, I preferably provide a portion intermediate two offsets 19 and 20 to which the banner is secured. The abrupt offsets provide stops for the banner and preclude its movement along the extension 14 either upwardly or downwardly, at the same time permitting it to pivot freely about the wire.

My advertising devices are particularly well adapted to be given away by gasoline companies and it will be appreciated that by virtue of the looped end of the wire and the readily engaged link they are readily attached by a gasoline station attendant. When installed, they do not detract from the appearance of the automobile and in no wise interfere with the driver's vision but present the advertising matter in an attractive and conspicuous way.

I claim:

1. An advertising device comprising a wire bent at one end into a partial loop adapted to encompass a support, an articulate means of closure for said loop arranged to engage detachably said wire, and means for positioning an advertising banner on said wire.

2. An advertising device comprising a wire bent at one end to form a partial loop with a terminal eyelet, and a link engaging said eyelet and adapted to be detachably hooked over said wire.

3. An advertising device comprising a wire having a pair of offsets adjacent one end and bent at the other end to form a partial loop with a terminal eyelet, a link fastened to said eyelet and adapted to hook over said wire, and an advertising banner engaging said wire between said offsets.

4. An advertising device comprising a wire, a loop adjacent one end thereof, a closure articulately secured to said wire, a bend in said wire adjacent said loop, the other end of said wire projecting materially from said loop, and an advertising banner directly mounted on said projection.

In testimony whereof, I have hereunto set my hand.

EDWARD H. SANDERS.